United States Patent [19]
Chinn

[11] 3,821,283
[45] June 28, 1974

[54] 4-BENZYLIDENE-5-OXO-2-PHENYL-1-CYCLOPENTENEACETIC ACID AND ANALOG THEREOF

[75] Inventor: Leland J. Chinn, Morton Grove, Ill.

[73] Assignee: G. D. Searle & Co., Chicago, Ill.

[22] Filed: Apr. 6, 1973

[21] Appl. No.: 348,528

[52] U.S. Cl.......... 260/473 R, 260/469, 260/501.1, 250/501.16, 260/515 R, 260/515 A, 260/520, 424/308, 424/316, 424/317
[51] Int. Cl................................ C07c 69/76
[58] Field of Search........... 260/520, 473 R, 515 A, 260/515 R, 469

[56] References Cited
UNITED STATES PATENTS
3,737,451   6/1973   Kathawala...................... 260/515 R

OTHER PUBLICATIONS

Beilstein "Handbuch der Organischer Chemie" 10 pp. 784–785, (1927).

Ermili et al. C.A. 6705d (1963).

Primary Examiner—Lorraine A. Weinberger
Assistant Examiner—John F. Terapane
Attorney, Agent, or Firm—John M. Brown

[57] ABSTRACT

Preparation of 4-benzylidene-5-oxo-2-phenyl-1-cyclopenteneacetic acid and congeners, and valuable biological properties thereof including antibacterial activity, are disclosed.

21 Claims, No Drawings

4-BENZYLIDENE-5-OXO-2-PHENYL-1-CYCLOPENTENEACETIC ACID AND ANALOG THEREOF

This invention relates to 4-benzylidene-5-oxo-2-phenyl-1-cyclopenteneacetic acid and congeners, and to processes for the preparation thereof. More particularly, this invention provides new, useful, and unobvious chemical compounds of the formula

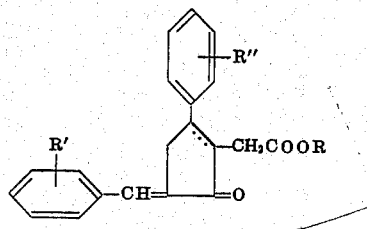

wherein R represent hydrogen, lower alkyl, or di(lower alkyl)=amino(lower alkyl); R' and R'' each represent hydrogen, halogen, or lower alkoxy; and the dotted line represents the locus of an optional double bond.

The term "lower alkyl," as used herein, designates a methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain, hydrocarbon radical of the formula

wherein n represents a positive integer less than 8. It follows that by "di(lower alkyl)amino(lower alkyl)" is meant dimethylaminomethyl, dimethylaminoethyl, diethyl=aminoethyl, diethylaminopropyl, dipropylaminobutyl, etc., the lower alkyl constituents contemplated in each occurrence being defined as before. Among these di(lower alkyl)amino=(lower alkyl) groupings, those of the formula

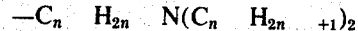

wherein n' and n'' represent positive integers less than 4 and 3, respectively, are preferred.

The halogens contemplated in the introductory formula are fluorine, chlorine, bromine, and iodine, among which fluorine and chlorine are preferred.

"Lower alkoxy" designates a radical of the formula

in which "lower alkyl" has the meaning previously assigned.

The positioning of the moieties represented by R' and R'' in the phenyl nuclei to which they attach is not critical, ortho, meta, and para locations alike being contemplated.

Equivalent to the foregoing compounds for the purposes of this invention are the alkali metal, alkaline-earth metal, ammonium, and lower alkylated ammonium salts of the acids contemplated by the introductory formula when R therein represents hydrogen. By "lower alkylated ammonium" is meant a cation of the formula

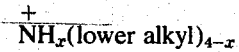

wherein "lower alkyl" is defined as above and x represents a positive integer less than 4. Likewise equivalent are complexes of the aforesaid acids and their salts, as also the acid addition salts of the basic esters of this invention having the formula

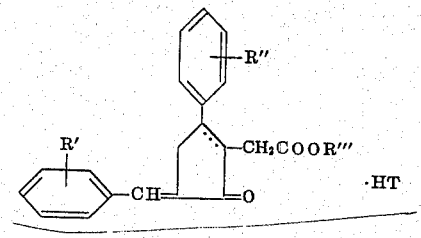

wherein R' and R'' are defined as before, R''' represents di(lower alkyl)amino(lower alkyl), and T represents one equivalent of an anion — for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like — which, in combination with the cationic portion of the enformulated salt, is neither biologically nor otherwise undesirable.

Those skilled in the art will recognize that the compounds of this invention wherein the five-membered ring is saturated can and do exist in more than one stereochemical configuration: The acetic acid side-chain and the adjoining phenyl substituent can each be situate either above or below the plane of the ring and, by the same token, either cis or trans with respect to each other. Both cis and trans configurations, as also mixtures thereof, are contemplated herein, albeit the trans configurations are preferred.

The compounds to which this invention relates are useful by reason of their valuable biological properties. Among these properties is antibiotic activity, and a particular manifestation of ssuch activity is the capacity of the instant compounds to inhibit the growth of *Erwinia sp*. A standardized test for this antibacterial effect is described in U.S. Pat. No. 3,682,951. The product of Examples 5, 9, 15C, and 17 hereinafter were active at concentrations of 1,000 mcgm./ml. in this test.

Certain of the compounds of this invention are antiinflammatory — for example, the products of Examples 12, 13, 15C, 23, and 26. Further, certain of the compounds are antihypertensive — for example, the products of Examples 26 and 27—and/or bradykinin antagonists—for example, the products of Examples 23 and 25.

Preparation of the instant compounds proceeds by prolonged contact in a nitrogen atmosphere between a substituted acetic acid of the formula

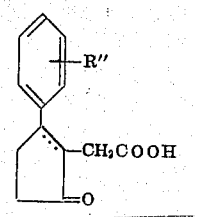

and aldehyde of the formula

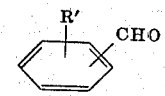

and potassium hydroxide, using ethanol as a solvent, followed by acidification with hydrochloric acid. The resultant product, which has the formula

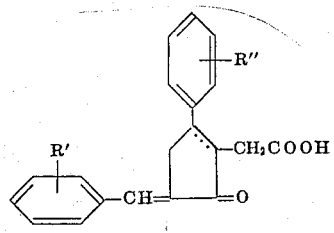

affords an alkali metal or alkaline-earth metal salt on being warmed with the metal hydroxide in ethanol, the ammonium salt on prolonged contact with excess ammonia q.s. saturation in 2-propanol, a lower alkylated ammonium salt by contacting in ether with an amine of the formula $$NH_{3-x}(lower\ alkyl)_x$$

and a lower alkyl ester by heating with an alcohol of the formula lower alkyl—OH in the presence of sulfuric acid. (R', R'', x, and the dotted line retain the meansings previously assigned.)
From the potassium salt of the aforesaid product, upon heating with a di(lower alkyl)amino(lower alkyl) chloride in 2-propanol, the corresponding basic ester is obtained. A mixture of such ester with an inorganic or strong organic acid wherein the anionic portion is defined by T above affords an acid addition salt.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

4-Benzylidene-5-oxo-2-phenyl-1-cyclopenteneacetic acid. A solution of 22 parts of 5-oxo-2-phenyl-1-cyclo=pentenacetic acid [J. Proc. Roy. Soc. N. S. Wales, 70, 431 (1937)], 16 parts of benzaldehyde, and 11 parts of potassium hydroxide in 440 parts of 95 percent ethanol is allowed to stand at room temperatures in a nitrogen atmosphere for 18 hours. The resultant mixture is partitioned between water and ether. The ether phase is discarded; the aqueous phase is acidified with 20 percent hydrochloric acid. The resultant mixture is extracted with ether. The ether extract is washed with water, dried over anhydrous sodium sulfate, and stripped of solvent by vacuum distillation. The residue is 4-benzylidene-5-oxo-2-phenyl-1-cyclopentene=acetic acid, having the formula

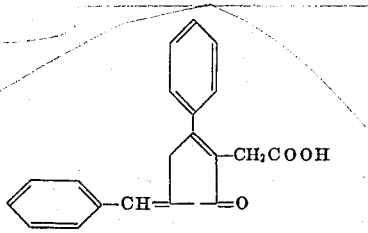

EXAMPLE 2

4-(p-Fluorobenzylidene)-5-oxo-2-phenyl-1-cyclo=penteneacetic acid. Substitution of 19 parts of p-fluoro=benzaldehyde for the benzaldehyde called for in Example 1 affords, by the procedure there detailed, 4-(p-fluorobenzyli=dene)-5-oxo-2-phenyl-1-cyclopenteneacetic acid.

EXAMPLE 3

4-(o-Fluorobenzylidene)-2-(p-fluorophenyl)-5-oxo-1-cyclopenteneacetic acid. Substitution of 2-(p-fluorophenyl)-5-oxo-1cyclopenteneacetic acid (U.S. Pat. No. 3,101,346) and 19 parts of o-fluorobenzaldehyde for the 5-oxo-2-phenyl-1-cyclopenteneacetic acid and benzaldehyde, respectively, called for in Example 1 affords, by the procedure detailed in the aforesaid example, 4-(o-fluorobenzylidene)-2-(p-fluorophenyl)-5-oxo-1-cyclopenteneacetic acid.

EXAMPLE 4

4-(m-Fluorobenzylidene)-2-(p-fluorophenyl)-5-oxo-1-cyclopenteneacetic acid. Substitution of 23 parts of 2-(p-fluorophenyl)-5-oxo-1-cyclopenteneacetic acid and 19 parts of m-fluorobenzaldehyde for the 5-oxo-2-phenyl-1-cyclopenteneacetic acid and benzaldehyde, respectively, called for in Example 1 affords, by the procedure detailed in the aforesaid example, 4-(m-fluorobenzylidene)-2-(p-fluorophenyl)-5-oxo-1-cyclopenteneacetic acid.

EXAMPLE 5

4-(p-Chlorobenzylidene)-2-(p-fluorophenyl)-5-oxo-1-cyclopenteneacetic acid. To a solution of 4 parts of 2-(p-fluorophenyl)-5-oxo-1-cyclopenteneacetic acid in 80 parts of 95 percent ethanol containing 2 parts of potassium hydroxide was added 3 parts of p-chlorobenzaldehyde. The resultant mixture is allowed to stand at room temperatures in a nitrogen atmosphere for 20 hours during which a crystalline precipitate forms. The precipitate is isolated by filtration, washed successively with ethanol and ether, and dried in air. It is thereupon taken up in a minimum amount of water, and the resultant solution is acidified with 20 percent hydrochloric acid. The voluminous precipitate which results is filtered off, washed with water, dried in air, and crystallized from ethyl acetate to give 4-(p-chlorobenzylidene)-2-(p-fluorophenyl)-5-oxo-1-cyclo=penteneacetic acid melting at 246°–250°.

EXAMPLE 6

2-(o-Chlorophenyl)-4-(p-fluorobenzylidene)-5-oxo-1-cyclopenteneacetic acid. Substitution of 25 parts of 2-(o-chlorophenyl)-5-oxo-1-cyclopenteneacetic acid and 19 parts of p-fluorobenzaldehyde for the 5-oxo-2-phenyl-1-cyclopentene acetic acid and benzaldehyde, respectively, called for in Example 1 affords, by the procedure detailed in the aforesaid example, 2-(o-chlorophenyl)-4-(p-fluorobenzylidene)-5-oxo-1-cyclopen=teneacetic acid.

EXAMPLE 7

4-(p-Chlorobenzylidene)-2-(m-chlorophenyl)-5-oxo-1-cyclopenteneacetic acid. Substitution of 25 parts of 2-(m-chlorophenyl)-5-oxo-1-cyclopenteneacetic acid and 21 parts of p-chlorobenzaldehyde for the 5-oxo-2-phenyl-1-cyclopenteneacetic acid and benzaldehyde, respectively, called for in Example 1 affords, by the procedure detailed in the aforesaid example, 4-(p-chloro=benzylidene)-2-(m-chlorophenyl)-5-oxo-1-cyclopenteneacetic acid.

EXAMPLE 8

4-(p-Chlorobenzylidene)-2-(p-chlorophenyl)-5-oxo-1-cyclopenteneacetic acid. To a solution of 4 parts of 2-(p-chlorophenyl)-5-oxo-1-cyclopenteneacetic acid [prepared from p-chloroacetophenone according to the procedure for preparing 2-(p-fluorophenyl)-5-oxo-1-cyclo=penteneacetic acid from p-fluoroacetophenone described in U.S. Pat. No. 3,101,346] in approximately 80 parts of 95 percent ethanol containing 2 parts of potassium hydroxide is added 3 parts of p-chlorobenzaldehyde. The resultant mixture is allowed to stand at room temperatures in a nitrogen atmosphere for 19 hours during which a crystalline precipitate forms. The precipitate is filtered off, successively washed with ethanol and ether, dried in air, and suspended in 10 volumes of water. A slight excess of concentrated hydrochloric acid is introduced, and the resultant mixture is allowed to stand at room temperatures for 3 hours. Insoluble solids are filtered out, washed with water, dried in air, and recrystallized from ethyl acetate to give 4-(p-chlorobenzylidene)-2-(p-chlorophenyl)-5-oxo-1-cyclopenteneacetic acid melting at 268°–270°.

EXAMPLE 9

2-(p-Fluorophenyl)-4-(p-methoxybenzylidene)-5-oxo-1-cyclopenteneacetic acid. To a solution of 10 parts of potassium hydroxide in 400 parts of 95 percent ethanol are consecutively added 20 parts of 2-(p-fluorophenyl)-5-oxo-1-cyclopenteneacetic acid and approximately 15 parts of p-methoxybenzaldehyde. The resultant mixture is allowed to stand at room temperatures in a nitrogen atmosphere for 20 hours during which a crystalline precipitate forms. The precipitate is isolated by filtration, washed successively with ethanol and ether, dried in air, and taken up in a minimum amount of water. To the aqueous solution is added sufficient 20 percent hydrochloric acid to induce acidity. The resultant precipitate is filtered off, washed with water, dried in air, and crystallized from ethyl acetate to give 2-(p-fluorophenyl)-4-(p-methoxybenzylidene)-5-oxo-1-cyclopenteneacetic acid melting at 234.5°–236.5°.

EXAMPLE 10

Methyl 2-(p-fluorophenyl)-4-(p-methoxybenzylidene)-5-oxo-1-cyclopenteneacetate. A mixture of 4 parts of 2-(p-fluorophenyl)-4-(p-methoxybenzylidene)-5-oxo-1-cyclopenteneacetic acid, 7 parts of concentrated sulfuric acid, and approximately 300 parts of methanol is heated at the boiling point under reflux for 3 hours, then concentrated to one-half volume by vacuum distillation in a nitrogen atmosphere. To the concentrate is added 5 volumes of water followed by aqueous 5 percent sodium bicarbonate q.s. neutrality. The gummy precipitate which forms crystallizes on standing. Isolated by filtration, washed with water, dried in air, and crystallized from ether, it affords methyl 2-(p-fluorophenyl-4-(p-methoxybenzylidene)-5-oxo-1-cyclopenteneacetate melting at approximately 160°–161°.

EXAMPLE 11

2-(o-Chlorophenyl)-4-(o-ethoxybenzylidene)-5-oxo-1-cyclopenteneacetic acid. Substitution of 25 parts of 2-(o-chlorophenyl)-5-oxo-1-cyclopenteneacetic acid and 23 parts of o-ethoxybenzaldehyde for the 5-oxo-2-phenyl-1-cyclopenteneacetic acid and benzaldehyde, respectively, called for in Example 1 affords, by the procedure detailed in the aforesaid example, 2-(o-chlorophenyl)-4-(o-ethoxybenzylidene)-5-oxo-1-cyclopenteneacetic acid.

EXAMPLE 12

2-(p-Chlorophenyl)-4-(p-methoxybenzylidene)-5-oxo-1-cyclopenteneacetic acid. To a solution of 100 parts of potassium hydroxide in 4,000 parts of 95 percent ethanol are consecutively added 200 parts of 2-(p-chlorophenyl)-5-oxo-1-cyclopenteneacetic acid and 168 parts of p-methoxybenz=aldehyde. The resultant mixture is allowed to stand at room temperatures in a nitrogen atmosphere for 20 hours during which a crystalline precipitate forms. The precipitate is isolated by filtration, washed successively with ethanol and ether, dried in air, and dissolved in a minimum amount of water. To the aqueous solution is added concentrated hydrochloric acid q.s. acidity. The precipitate which forms is filtered off, washed with water, dried in air, and crystallized from ethyl acetate to give 2-(p-chlorophenyl)-4-(p-methoxybenzylidene)-5-oxo-1-cyclopenteneacetic acid melting at 228.5°–232.5°.

EXAMPLE 13

Methyl 2-(p-Chlorophenyl)-4-(p-methoxybenzylidene)-5-oxo-1-cyclopenteneacetate. A mixture of 3 parts of 2-(p-chlorophenyl)-4-(p-methoxybenzylidene)-5-oxo-1-cyclopentene=acetic acid, approximately 2 parts of concentrated sulfuric acid, and 80 parts of methanol is heated at the boiling point under reflux for 3 hours, then concentrated to approximately one-half volume by vacuum distillation. The residue is diluted with 5 volumes of water, and the resultant solution is neutralized with aqueous 5 percent sodium bicarbonate. The solid which precipitates is filtered out, washed with water, dried in air, and crystallized from ether to give methyl 2-(p-chlorophenyl)-4-(p-methoxybenzylidene)-5-oxo-1-cyclopenteneacetate melting at approximately 153°–154°.

EXAMPLE 14

Ethyl 2-(p-chlorophenyl)-4-(p-methoxybenzylidene)-5-oxo-1-cyclopenteneacetate. To a mixture of 3 parts of 2-(p-chlorophenyl)-4-(p-methoxybenzylidene)-5-oxo-1-cyclopenteneacetic acid, approximately 2 parts of concentrated sulfuric acid, and 80 parts of ethanol is heated at the boiling point under reflux for 3 hours, then concentrated to one-half volume by vacuum distillation. The residue is diluted with 5 volumes of water, and the resultant mixture is neutralized with aqueous 5 percent sodium bicarbonate. The mixture is then extracted with ether. The ether extract is washed with water, dried over anhydrous sodium sulfate, and thereupon stripped of solvent by vacuum distillation. The product thus obtained is ethyl 2-(p-chlorophenyl)-4-(p-methoxybenzylidene)-5-oxo-1-cyclopen=teneacetate.

EXAMPLE 15

A. Potassium 2-(p-chlorophenyl)-4-(p-methoxy-benzylidene)-5-oxo-1-cyclopenteneacetate. To a solution of 66 parts of 2-(p-chlorophenyl)-4-(p-methoxybenzylidene)-5-oxo-1-cyclopenteneacetic acid in a minimum amount of ethanol is added a solution of 10 parts of potassium hydroxide in 15 parts of water. The precipitate which forms is filtered out, washed with ether, and dried in air. The product thus isolated is potassium 2-(p-chlorophenyl)-4-(p-methoxybenzylidene)-5-oxo-1cyclopenteneacetate.

B. 2-Diethylaminoethyl 2-(p-chlorophenyl)-4-(p-methoxybenzylidene)-5-oxo-1-cyclopenteneacetate. A mixture of 6 parts of potassium 2-(p-chlorophenyl)-4-(p-methoxybenzylidene)-5-oxo-1-cyclopenteneacetate, 3 parts of diethylaminoethyl chloride, and 130 parts of 2-propanol is stirred and heated at the boiling point under reflux for 24 hours, whereupon most of the solvent is removed by vacuum distillation. The residue is triturated with water. The resultant mixture is extracted with ether. The ether extract is dried over anhydrous sodium sulfate and then stripped of solvent by vacuum distillation. The residue is 2-diethylaminoethyl 2-(p-chlorophenyl)-4-(p-methoxybenzylidene)-5-oxo-1-cyclopenteneacetate.

C. 2-Diethylaminoethyl 2-(p-chlorophenyl)-4-(p-methoxybenzylidene)-5-oxo-1-cyclopenteneacetate oxalate. To a solution of 10 parts of 2-diethylaminoethyl 2-(p-chlorophenyl)-4-(p-methoxybenzylidene)-5-oxo-1-cyclopentene-acetate in 8 parts of 95 percent ethanol is added a solution of 2 parts of oxalic acid in 5 parts of ethanol. The solid which forms is filtered off, washed with ether, and dried in air, to give 2-diethylaminoethyl 2-(p-chlorophenyl)-4-(p-methoxybenzylidene)-5-oxo-1cyclopenteneacetate oxalate melting at 146.5–149.5°.

D. 2-Diethylaminoethyl 2-(p-chlorophenyl)-4-(p-methoxybenzylidene)-5-oxo-1cyclopenteneacetate hydrochloride. To a solution of 100 parts of 2-diethyl-aminoethyl-2-(p-chlorophenyl)-4-(p-methoxybenzylidene)-5-oxo-1-cyclopenteneacetate in 160 parts of 2-propanol is added a solution of 13 parts of hydrogen chloride in 40 parts of 2-propanol. The resultant mixture is chilled and then diluted with sufficient ether to effect precipitation of a gum. The supernatant liquid is decanted and the gum repeatedly triturated with ether to afford 2-diethylaminoethyl 2-(p-chlorophenyl)-4-(p-methoxybenzylidene)-5-oxo-1cyclopenteneacetate hydrochloride as a powder melting in the range 88°–105°.

EXAMPLE 16

3-Dimethylaminopropyl 2-(p-chlorophenyl)-4-(p-methoxybenzylidene)-5-oxo-1-cyclopenteneacetate. Substitution of 3 parts of dimethylaminopropyl chloride for the diethylaminoethyl chloride called for in Example 15B affords, by the procedure there detailed, 3-dimethylaminopropyl 2-(p-chlorophenyl)-4-(p-methoxybenzylidene)-5oxo-1-cyclo-penteneacetate.

EXAMPLE 17

4-(p-Chlorobenzylidene)-2-(p-methoxyphenyl)-5-oxo-1-cyclopenteneacetic acid. To a solution of 2 parts of potassium hydroxide in 80 parts of 95 percent ethanol are consecutively added 4 parts of 2-(p-methoxyphenyl)-5-oxo-1cyclo-penteneacetic acid [Zhur. Obschchei. Khim., 28, 528 (1968)] and 3 parts of p-chlorobenzaldehyde. The resultant mixture is allowed to stand at room temperatures in a nitrogen atmosphere for 23 hours. The solid precipitate which forms is filtered off, successively washed with ethanol and ether, dried in air, and taken up in a minimum amount of water. To the aqueous solution is added a slight excess of approximately 20 percent hydrochloric acid. The resultant precipitate is filtered off, washed with water, dried in air, and crystallized from ethyl acetate to give 4-(p-chlorobenzylidene)-2-(p-methoxyphenyl)-5-oxo-1-cyclopenteneacetic acid melting at 227°–229°.

EXAMPLE 18

2-(m-Ethoxyphenyl)-4-(o-fluorobenzylidene)-5-oxo-1-cyclopenteneacetic acid. Substitution of 26 parts of 2-(m-ethoxyphenyl)-5-oxo-1-cyclopenteneacetic acid (U.S. Pat. No. 3,019,233) and 19 parts of o-fluorobenzaldehyde for the 5-oxo-2-phenyl-1-cyclopenteneacetic acid and benzaldehyde, respectively, called for in Example 1, affords, by the procedure detailed in the aforesaid example, 2-(m-ethoxyphenyl)-4-(o-fluorobenzylidene)-5-oxo-1-cyclopetene-acetic acid.

EXAMPLE 19

4-(p-Methoxybenzylidene)-2-(p-methoxyphenyl)-5-oxo-1-cyclopenteneacetic acid. To a solution of 34 parts of potassium hydroxide in 1,360 parts of 95 percent ethanol are consecutively added 67 parts of 2-(p-methoxyphenyl)-5-oxo-1-cyclopenteneacetic acid and 550 parts of p-methoxy-benzaldehyde. The resultant solution is allowed to stand at room temperatures in a nitrogen atmosphere for 20 hours, whereupon the precipitate which forms is filtered off, washed with ethanol, dried in air, and then taken up in a minimum amount of water. To the aqueous solution is added sufficient concentrated hydrochloric acid to induce acidity. The precipitate which forms is filtered out, washed with water, dried in air, and crystallized from ethyl acetate to give 4-(p-methoxybenzylidene)-2-(p-methoxyphenyl)-5-oxo-1-cyclopenteneacetic acid which melts at 208.5–211.5° and resolidifies to melt again at 227°–230°.

EXAMPLE 20

Methyl 4-(p-methoxybenzylidene)-2-(p-methoxyphenyl)-5-oxo-1cyclopenteneacetate. A mixture of 11 parts of 4-(p-methoxybenzylidene)-2-(p-methoxyphenyl)-5-oxo-1-cyclo-penteneacetic acid, 7 parts of concentrated sulfuric acid, and 320 parts of methanol is heated at the boiling point under reflux for 3 hours, then concentrated to one-half volume by vacuum distillation in a nitrogen atmosphere. The concentrate is diluted with 5 volumes of water, and the resultant mixture is neutralized with aqueous 5 percent sodium bicarbonate. The gum which forms is isolated by decanting the liquid phase therefrom, washed with water, dried in air, and crystallized from ether to give methyl 4-(p-methoxybenzylidene)-2-(p-methoxyphenyl)-5-oxo-1-cyclopenteneacetate melting at 143.5°–145.5°.

EXAMPLE 21

4-(o-Ethoxybenzylidene)-2-(m-ethoxphenyl)-5-oxo-1-cyclopenteneacetic acid. Substitution of 26 parts of 2-(m-ethoxyphenyl)-5-oxo-1cyclopenteneacetic acid and 23 parts of o-ethoxybenzaldehyde for the 5-oxo-2-phenyl-1- cyclopenteneacetic acid and benzaldehyde called for in Example 1, respectively, affords, by the procedure detailed in the aforesaid example, 4-(o-ethoxybenzylidene)-2-(m- ethoxphenyl)-5-oxo-1-cyclopenteneacetic acid.

EXAMPLE 22

3-Benzylidene-5-phenyl-2-oxocyclopentaneacetic acid. Substitution of 22 parts of 5-phenyl-2-oxocyclopentaneacetic acid [J. Proc. Roy. Soc. N. S. Wales, 70, 431 (1937)] for the 5-oxo-2-phenyl-1-cyclopenteneacetic acid called for in Example 1 affords, by the procedure there detailed, 3-benzylidene-5-phenyl-2-oxocyclopentaneacetic acid. The product has the formula

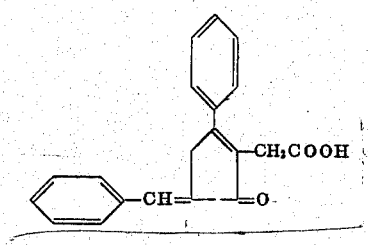

EXAMPLE 23

5-(p-Fluorophenyl)-3-(p-methoxybenzylidene)-2-oxocyclopentaneacetic acid triethylamine salt. A solution of 40 parts of 5-(p-fluorophenyl)-2-oxocyclopentaneacetic acid (U.S. Pat. No. 3,101,346) and 20 parts of potassium hydroxide in a mixture of 33 parts of p-methoxybenzaldehyde and 800 parts of 95 percent ethanol is allowed to stand at room temperatures in a nitrogen atmosphere for 18 hours. The reaction mixture is then partitioned between water and ether. The ether is discarded. The aqueous phase is acidified with 22 percent hydrochloric acid. The resultant mixture is extracted with ether. The ether extract is washed with water, dried over anhydrous sodium sulfate, and stripped of solvent by distillation. The residue is taken up in 140 parts of ether. To the ether solution is added 11 parts of triethylamine. The gum which forms initially solidifies on standing. The solid is filtered off and crystallized from a mixture of 2-propanol and ethol to give a triethylamine salt of 5-(p-fluorophenyl)-3-(p-methoxybenzylidene)-2-oxocyclopentaneacetic acid melting at 112.5°–114.5° and which can be represented by the formula

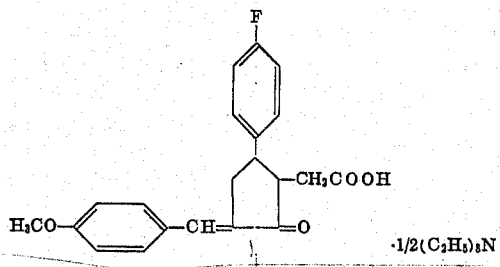

EXAMPLE 24

5-(o-Chlorophenyl)-3-(o-ethoxybenzylidene)-2-oxocyclopentaneacetic acid. Substitution of 25 parts of 5-(o-chlorophenyl)-2-oxocyclopentaneacetic acid [prepared by hydrogenating 2-(o-chlorophenyl)-5-oxo-1-cyclopentene=acetic acid using palladium-on-charcoal catalyst, in accordance with the procedure for preparing 5-(p-fluoro=phenyl)-2-oxocyclopentaneacetic acid from 2-(p-fluorophenyl)- 5-oxo-1-cyclopenteneacetic acid described in U.S. Pat. No. 3,101,346] and 23 parts of o-ethoxybenzaldehyde for the 5-oxo-2- phenyl-1-cyclopenteneacetic acid and benzaldehyde, respectively, called for in Example 1, affords, by the procedure detailed in the aforesaid example, 5-(o-chlorophenyl)- 3-(o-ethoxybenzylidene)-2-oxocyclopentaneacetic acid.

EXAMPLE 25

3-(p-Methoxybenzylidene)-5-(p-methoxyphenyl)-2-oxocyclopentaneacetic acid. A solution of 40 parts of potassium hydroxide in 1,600 parts of ethanol is sufficiently warmed to permit dissolving therein 90 parts of 5-(p-methoxyphenyl)-2- oxocyclopentaneacetic acid [Zhur. Obschchei. Khim., 28, 528 (1968]. To this solution is added 66 parts of p-methoxybenzaldehyde. The resultant mixture is allowed to stand at room temperatures in a nitrogen atmosphere for 24 hours, whereupon it is partitioned between water and ether. The ether phase is discarded. The aqueous phase is acidified with 22 percent hydrochloric acid. The mixture which results is extracted with ether. The ether extract is washed with water, dried over anhydrous sodium sulfate, stripped of solvent by distillation, and crystallied from a mixture of ether and hexane to give 3-(p-methoxybenzylidene)-5-(p-methoxypheny)-2-oxocyclo=pentaneacetic acid melting at 97°–101°.

EXAMPLE 26

Methyl 3-(p-Methoxybenzylidene)-5-(p-methoxyphenyl)- 2-oxocyclopentaneacetate. A solution of 30 parts of 3- (p-methoxybenzylidene)-5-(p-methoxyphenyl)-2-oxocyclopentane=acetic acid and 22 parts of concentrated sulfuric acid in 960 parts of methanol is heated at the boiling point under reflux for 2 hours, then concentrated to somewhat less than one-half volume by vacuum distillation. The concentrate contains a crystalline precipitate. Approximately 5 volumes of water is introduced, followed by sufficient aqueous 5 percent sodium bicarbonate to effect neutrality. Insoluble solids are thereupon filtered out, washed with water, dried in air, and crystallized from a mixture of ethyl acetate and ether to give methyl 3- (p-methoxybenzyli=dene)-5-(p-methoxyphenyl)-2-oxocyclopentaneacetate melting at approximately 143.5°–144.5°.

EXAMPLE 27

Ethyl 3-(p-methoxybenzylidene)-5-(p-methoxyphenyl)- 2-oxocyclopentaneacetate. A solution of 3 parts of 3-(p- methoxybenzylidene)-5-(p-methoxyphenyl)-2-oxocyclopentane=acetic acid and 4 parts of concentrated sulfuric acid in 175 parts of ethanol is heated at the boiling point under reflux for 1 ½ hours, then concentrated to one-half volume by vacuum distillation. The concentration is partitioned between water and ether. The ether phase is separated, washed with water, dried over anhydrous sodium sulfate, and stripped of solvent by vacuum distillation. The residual oil is crystallized from a mixture of ether and hexane to give ethyl 3-(p-methoxybenzylidene)-5-(p- methoxyphenyl)-2-oxocyclopentaneacetate melting at approximately 91°-92°.

EXAMPLE 28

3-(o-Ethoxybenzylidene)-5-(m-ethoxyphenyl)-2-oxocyclopentaneacetic acid. Substitution of 26 parts of 5-(m-ethoxyphenyl)-2-oxocyclopentaneacetic acid (U.S. Pat. No. 3,019,233) and 23 parts of o-ethoxybenzaldehyde for the 5-oxo-2phenyl-1-cyclopenteneacetic acid and benzaldehyde, respectively, called for in Example 1 affords, by the procedure detailed in the aforesaid example, 3-(o-ethoxy=benzylidene)-5-(m-ethoxyphenyl)-2-oxocyclopentaneacetic acid.

What is claimed is:

1. A compound of the formula

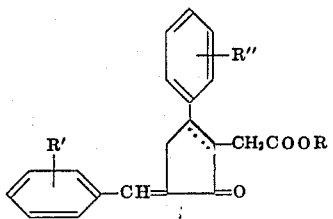

wherein R represents hydrogen, lower alkyl, or di(-lower alkyl)amino(lower alkyl); R' and R" each represent hydrogen, halogen of atomic number less than 18 or lower alkoxy; and the dotted line represents the locus of an optional double bond.

2. A compound according to claim 1 having the formula

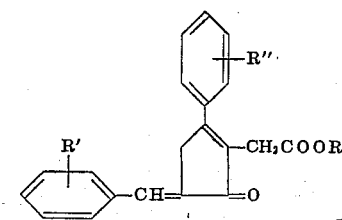

wherein R represents hydrogen, lower alkyl, or di(-lower alkyl) amino (lower alkyl) and R' and R" each represent hydrogen, halogen of atomic number less than 18, or lower alkoxy.

3. A compound according to claim 1 having the formula

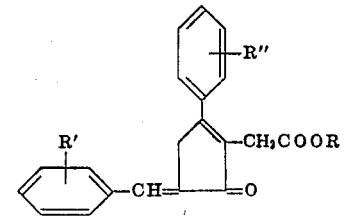

wherein R represents hydrogen or lower alkyl and R' and R" each represent hydrogen, halogen of atomic number less than 18, or lower alkoxy.

4. A compound according to claim 1 having the formula

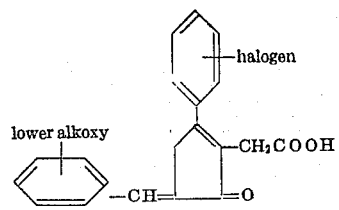

wherein each halogen has an atomic number less than 18.

5. A compound according to claim 1 which is 4-(p-chlorobenzylidene)-2-(p-fluorophenyl)-5-oxo-1-cyclopenteneacetic acid.

6. A compound according to claim 1 having the formula

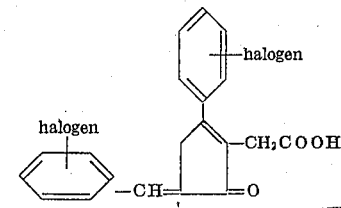

wherein the halogen has an atomic number less than 18.

7. A compound according to claim 1 which is 2-(p-chlorophenyl)-4-(p-methoxybenzylidene-5-oxo-1-cyclopenteneacetic acid.

8. A compound according to claim 1 having the formula

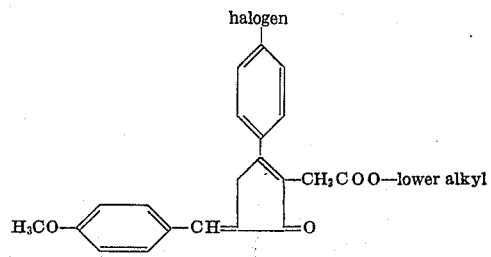

wherein the halogen has an atomic number less than 18.

9. A compound according to claim 1 which is methyl 2-(p-chlorophenyl)-4-(p-methoxybenzylidene)-5-oxo-1-cyclopenteneacetate.

10. A compound according to claim 1 having the formula

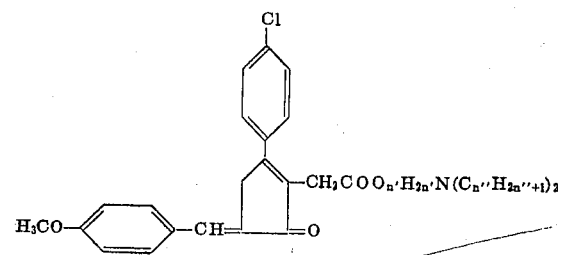

wherein $n'$ and $n''$ represent positive integers less than 4 and 3, respectively.

11. A compound according to claim 1 which is 2-diethylaminoethyl 2-(p-chlorophenyl)-4-(p-methoxy=benzylidene)-5-oxo-1-cyclopenteneacetate.

12. A compound according to claim 1 having the formula

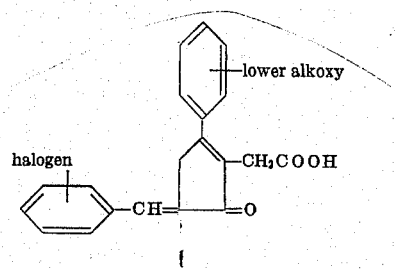

wherein the halogen has an atomic number less than 18.

13. A compound according to claim 1 which is 4-(p-chlorobenzylidene)-2-(p-methoxyphenyl)-5-oxo-1-cyclopenteneacetic acid.

14. A compound according to claim 1 having the formula

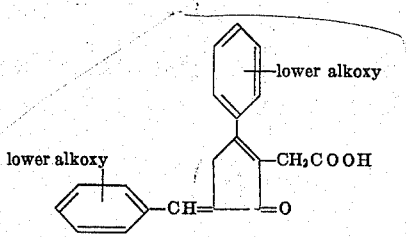

15. A compound according to claim 1 having the formula

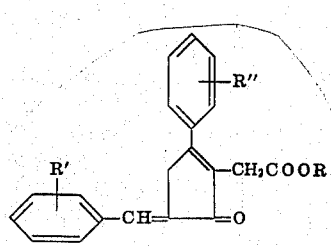

wherein R represents hydrogen or lower alkyl and R' and R'' each represent halogen of atomic number less than 18 or lower alkoxy.

16. A compound according to claim 1 having the formula

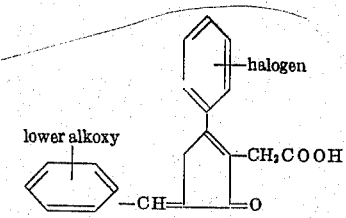

wherein the halogen has an atomic number less than 18.

17. A compound according to claim 1 which is 5-(p-fluorophenyl)-3-(p-methoxybenzylidene)-2-oxocyclo=pentaneacetic acid.

18. A compound according to claim 1 having the formula

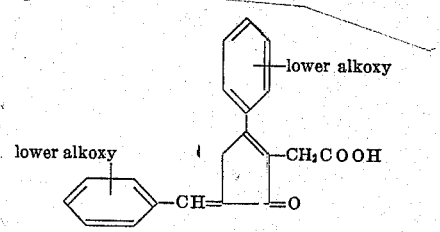

19. A compound according to claim 1 which is 3-(p-methoxybenzylidene)-5-(p-methoxyphenyl)-2-oxocyclo= pentaneacetic acid.

20. A compound according to claim 1 having the formula

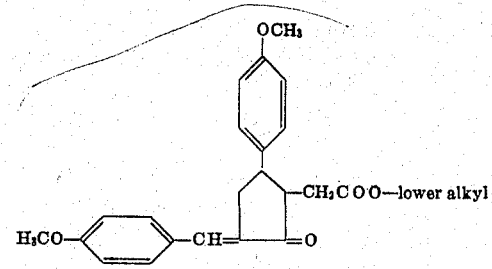

21. A compound according to claim 1 which is methyl 3-(p-methoxybenzylidene)-5-(p-methoxyphenyl)-2-oxocyclopentaneacetate.

* * * * *